(12) United States Patent
Durfee

(10) Patent No.: US 8,508,828 B2
(45) Date of Patent: Aug. 13, 2013

(54) MAGNETIC VOICE-COIL SHUTTER DRIVE ACTUATION SYSTEM

(75) Inventor: David W. Durfee, Rochester, NY (US)

(73) Assignee: CVI Laser, LLC, Rochester, NY (US)

( * ) Notice: Subject to any disclaimer, the term of this patent is extended or adjusted under 35 U.S.C. 154(b) by 448 days.

(21) Appl. No.: 12/312,563

(22) PCT Filed: Nov. 15, 2007

(86) PCT No.: PCT/US2007/024006
§ 371 (c)(1),
(2), (4) Date: Mar. 23, 2011

(87) PCT Pub. No.: WO2008/060600
PCT Pub. Date: May 22, 2008

(65) Prior Publication Data
US 2011/0181935 A1 Jul. 28, 2011

Related U.S. Application Data

(60) Provisional application No. 60/859,224, filed on Nov. 15, 2006.

(51) Int. Cl.
*G02B 26/02* (2006.01)

(52) U.S. Cl.
USPC .......................................................... 359/230

(58) Field of Classification Search
USPC ........................ 359/230; 310/49 R, 266, 268
See application file for complete search history.

(56) References Cited

U.S. PATENT DOCUMENTS 7,560,836 B2 * 7/2009 Yasuda ..................... 310/49.22

* cited by examiner

*Primary Examiner* — Euncha Cherry
(74) *Attorney, Agent, or Firm* — Steven R. Scott

(57) ABSTRACT

This magnetic voice-coil shutter drive actuation system for an optical shutter having an aperture with at least one shutter blade includes an actuator operating to open/close the shutter blade when moved in opposing directions, and a moveable element that operates said actuator and can be a moveable voice coil or a moveable permanent magnet. The voice coil is activatable to generate an electromagnetic flux in opposing polar orientations to react against the magnetic flux produced by the permanent magnet. The moveable element can be located in a position peripheral of the aperture and not surrounding the aperture, or in a position peripheral of the aperture and surrounding the aperture. The magnetic flux produced by the permanent magnet and the electromagnetic flux produced by the voice coil define magnetic axes that are parallel to each other and to a central axis for the aperture.

13 Claims, 5 Drawing Sheets

MAGNETIC VOICE-COIL SHUTTER DRIVE ACTUATION SYSTEM

CROSS-REFERENCE TO RELATED APPLICATIONS

This application claims an invention which was disclosed in a U.S. provisional patent application filed Nov. 15, 2006, Ser. No. 60/859,224, entitled "Magnetic Voice-Coil Shutter Drive Actuation System". Priority benefit of the said United States provisional application is hereby claimed, and the aforementioned application is hereby incorporated herein by reference.

BACKGROUND AND SUMMARY

Most commercially-available electromagnetic shutters are driven by linear solenoids. While readily available and inexpensive, they are very inefficient shutter actuators. Inherently non-linear, they provide much-reduced force at the beginning of pull-in (just when the shutter requires maximum force to achieve high acceleration and short actuation time). They provide very short stroke, typically requiring troublesome lever mechanisms to match the longer stroke required by the shutter drive mechanism. Furthermore, the short stroke often requires tight manufacturing tolerance and/or custom alignment of solenoid to drive linkage. At smallest sizes, solenoids provide very poor power efficiency for given output force/stroke.

Rotary solenoids are sometimes used for shutter drive. And, while these sometimes contain non-linear helical ramps to smooth out the force/distance curve, they still have disadvantages in cost, energy efficiency, and size.

DC motor actuators have occasionally been used. While they offer more linear force/torque output and better power efficiency, they still have several disadvantages. Their size/shape configuration is not well matched to the low-profile donut-shaped space envelope requirements of an optical shutter. Size trade-offs (tiny motors) reduce power efficiency. Power coupling drives are sometimes costly and/or inefficient. Motor inertia slows the start/stop response. And motor brushes add reliability and debris concerns for this short-stroke start/stop application.

Some proprietary electromagnetic shutter drives (i.e., Kodak) use magnets and coils to drive a shutter. However, these all include an iron core electromagnet. These have the disadvantage of higher inductance of the coil assembly. And most of these designs have magnet/pole cogging (requiring higher drive current just to overcome magnet/pole attraction before actuator motion takes place.)

Thus, there is a continuing need for new and improved shutter actuation mechanisms and technology. I have, therefore, developed a voice coil drive for optical shutters. The resultant voice coil shutter drive system, driven by Lorentz forces between electromagnet coil and permanent magnetic flux, allows a very energy efficient, cost efficient linear actuation mechanism for an optical shutter mechanism. In addition, it offers numerous other advantages over current technology:

First, a superior linear force curve (force is fairly constant for given drive current, regardless of actuator position), allowing a smooth, fast and efficient shutter drive.

Second, its coreless magnetic design allows driving at low currents (as it does not have to overcome magnetic cogging of typical motor designs).

Third, it can have low inertia moving mass, allowing efficient high-speed actuation.

Fourth, its simplicity and long-strong actuation allow simple, cost efficient manufacturing of shutter assemblies. Tight tolerances and custom fit-up are not required.

Fifth, my direct drive system offers good system reliability and efficient power transfer.

Sixth, the size/shape and configuration of my system can be well matched to fit within compact shutter space envelopes, even while allowing substantial magnet flux (and thus high energy efficiency).

DESCRIPTION

Figure 1:
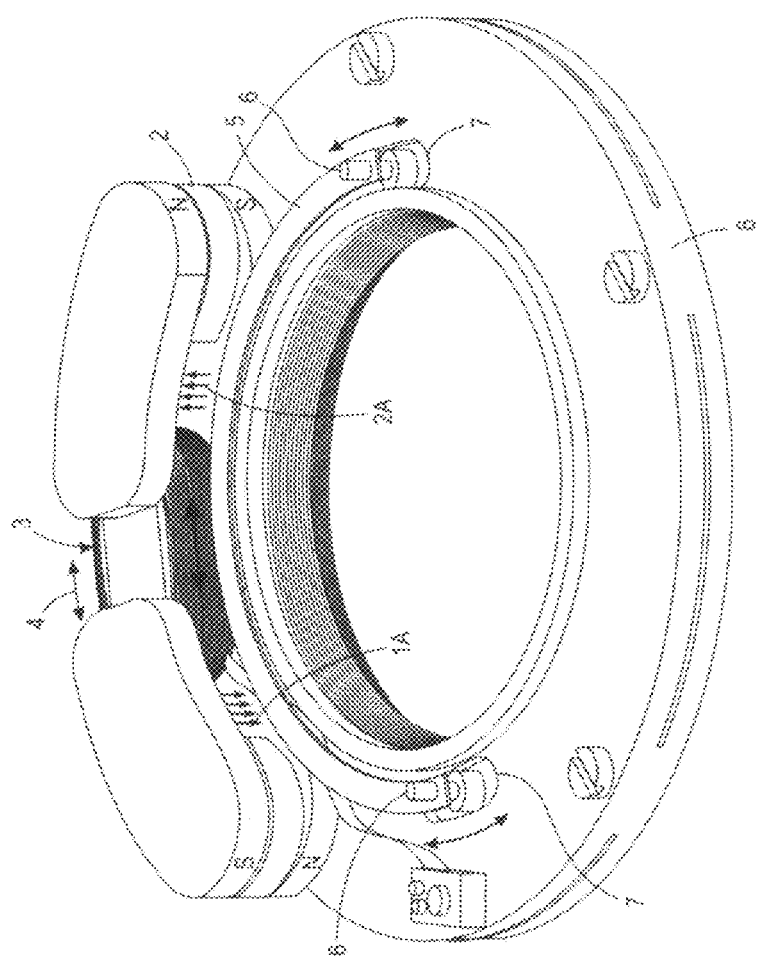
FIG. 1 provides a schematic perspective view of a side drive voice coil shutter assembly.

The exemplary side drive voice coil shutter assembly of FIG. 1 provides important insights into the functioning of my invention. As will be noted, it has two permanent magnets, magnet 1 and magnet 2, arranged with magnetic flux conducting members so as to create opposite poles above/below conducting coil 3 and producing magnetic flux 1A (magnet 1) and 2A (magnet 2) between their respective poles. The coil 3 is slideably mounted (as illustrated by arrows 4) so as to be able to move toward Magnet 1 and away from Magnet 2, or vice versa, depending on the magnetic flux direction created by current flow in coil 3. Coil 3 is attached to a wishbone linkage 5 which is, in turn, attached to actuators 6 (slidable in housing slots 7) for the blade drive ring of the shutter. Thus, as coil 3 is driven toward or away from, e.g., magnet 1, by the Lorentz forces created between permanent magnets 1, 2 and coil 3, it will drive actuators 6 and 7, thereby driving the shutters of the blade drive ring of shutter housing 8 towards an open or closed position. (An alternate arrangement is to have the coil and magnets interchanged so that there are two coils and one magnet—this is a simpler arrangement although it will typically operate at a lower speed).

Figure 2:
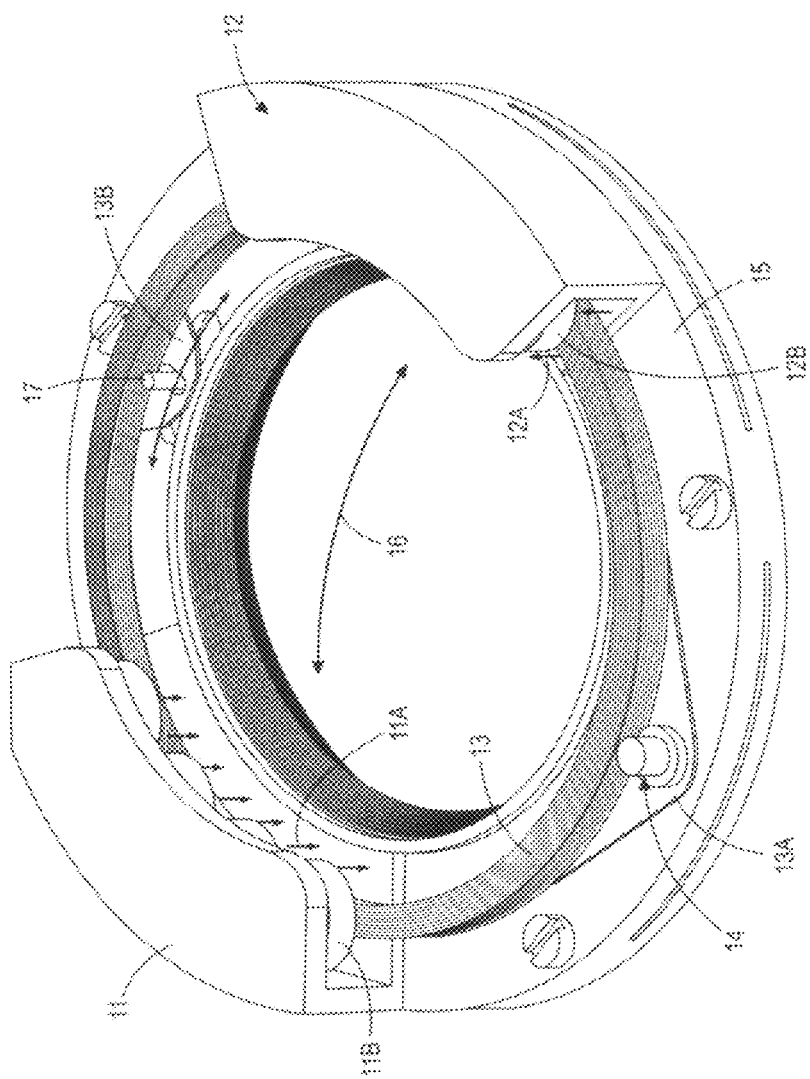
FIG. 2 provides a schematic perspective view of a voice coil shutter assembly with a moving coil having a side pivot.

The side pivoted moving coil voice coil shutter assembly of FIG. 2 uses the same basic principles, but applies the Lorentz force created between its permanent magnets and the magnetic field created by current in a coil to shift the pivotally mounted coil from side-to-side. In this embodiment, each permanent magnet assembly includes iron magnet frames 11, 12 serving as magnetic flux conductors for, respectively, magnetic flux 11A, 12A created by rare earth magnets 11B, 12B mounted to frames 11, 12. Coil 13 is laminated on a ring shaped plate 13A, which is pivotally mounted (by pivot 14) to shutter housing 15 so as to be capable of shifting towards one of the permanent magnet assemblies and away from the other permanent magnet assembly (as illustrated by arrows 16) depending, once again, on the direction of the magnetic flux created by current through coil 13. As coil 13 shifts, it drives shutter actuator 17 via an extension 13B of ring shaped plate 13A, thereby driving the shutters of the blade drive ring of shutter housing 15 towards an open or closed position.

Figure 3:
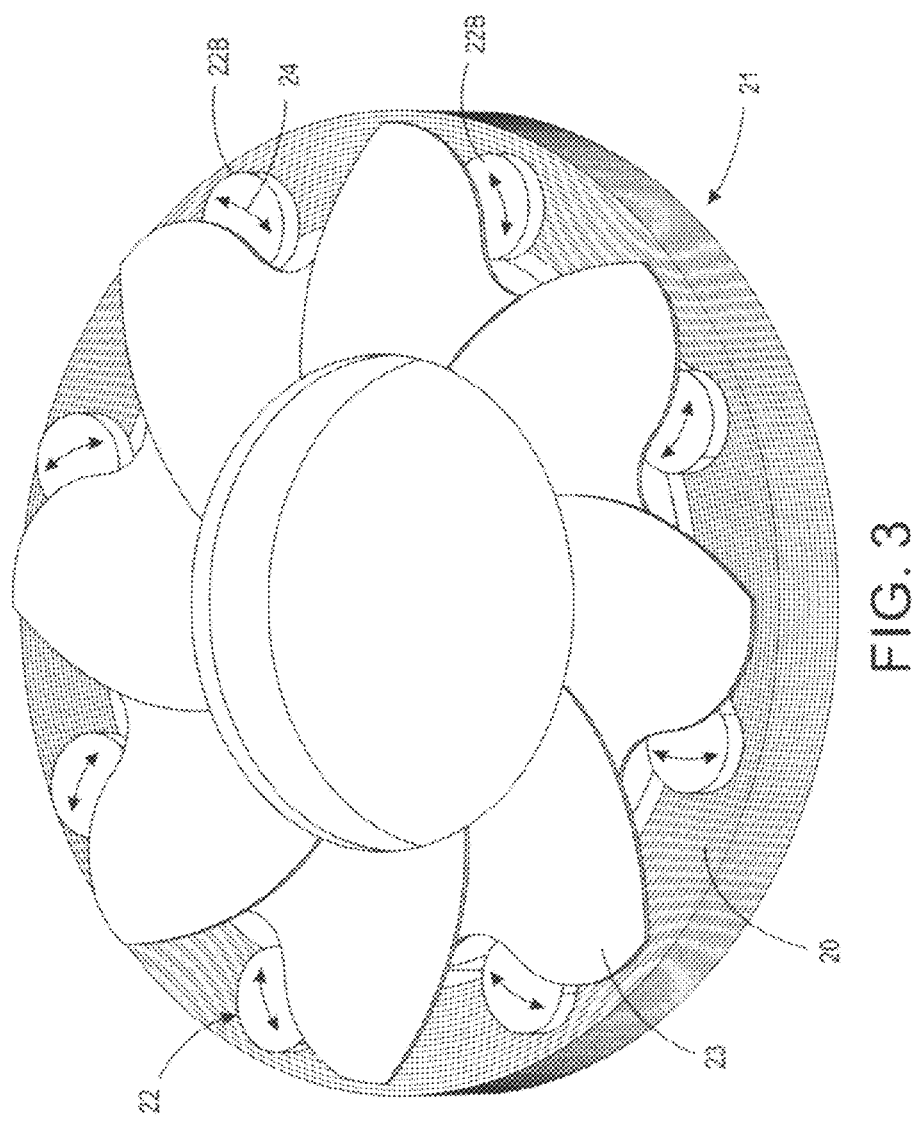
FIG. 3 provides a schematic perspective view from above of a swing link voice coil shutter assembly.
Figure 4:
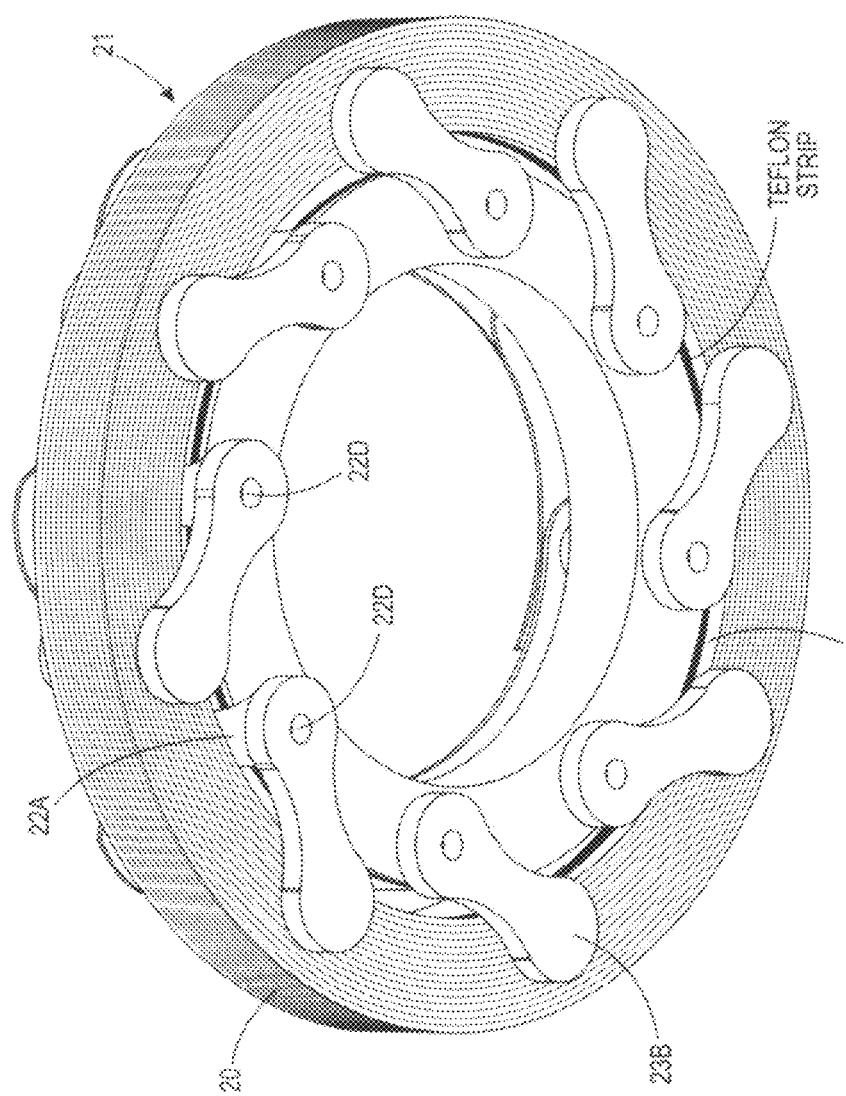
FIG. 4 provides a schematic perspective view from below of a swing link voice coil shutter assembly.
Figure 5:
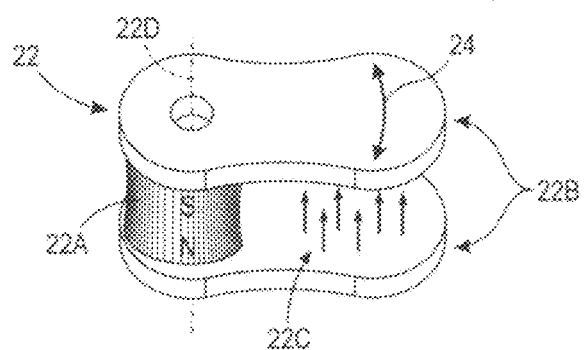
FIG. 5 provides a more detailed view of a swing link of the swing link voice coil shutter assembly.

The swing link voice coil shutter assembly of FIGS. 3, 4 and 5, has a coil 20 that is non-moving and peripherally mounted in/on its shutter housing 21. A plurality of swing links 22 connected to and serving as actuators for respective shutter blades 23 are mounted so as to interact with coil 20. Each swing link 22 is comprised of a permanent magnet 22A (preferably a rare earth magnet) with magnetic flux conducting pole plates 22B bonded to its respective poles so as to create a magnetic flux 22C between the ends of opposing pole plates 22B. In this particular embodiment, the pivot axis 22D of each swing link is inside of the coil 20 and directly mounted to a shutter blade 23, with its ends free to swing outward or inward (as indicated by arrows 24, depending on the direction of current in coil 20. Thus, depending on the current direction in coil 20, shutter blades 23 are driven towards an open or closed position.

In addition to the previously described configurations, my invention could be produced in several other alternate configurations having their own unique advantages and/or applications. These would include a moving coil, side-mounted, center pivot with direct drive to a shutter blade drive ring. This is the simplest arrangement (a configuration similar to a computer disk drive read head actuator). They could also include a moving coil, side pivot (with eccentric swing) for highest efficiency in tight ID/OD cross section. Likewise, a moving magnet can be arranged in a manner comparable to either of the first two layouts set forth above, or in "swing link" fashion as shown in FIGS. 3 and 4 (swinging the pole pieces around the magnets). There could be a vertical moving arrangement with helical ramps, flexures, or pivot linkage to transfer motion to lateral plane. Finally, in terms of this recitation, there could be various other combinations of the features/systems described above (all using the basic principles of this invention as applied to a shutter drive). Moreover, various of the above-disclosed and other features and functions, or alternatives thereof, may be desirably combined into many other different systems or applications.

Thus, as will be appreciated from review of this disclosure, numerous variations can be made and/or produced without exceeding the scope of the inventive concept. There are, therefore, a variety of presently unforeseen or unanticipated alternatives, modifications, variations or improvements therein which may be subsequently made by those skilled in the art which are also intended to be encompassed by this application and the claims to follow.

What is claimed is:

1. A magnetic voice-coil shutter drive actuation system for an optical shutter having an aperture with at least one shutter blade, comprising:
    a) an actuator operatively connected to an aperture shutter blade, said actuator operating to close said aperture shutter blade when moved in one direction and operating to open said aperture shutter blade when moved in an other direction;
    b) a moveable element comprising one of a moveable voice coil and a moveable permanent magnet operatively connected to said actuator, said voice coil being activatable to generate an electromagnetic flux in a first polar orientation and also being activatable to generate an electromagnetic flux in a second polar orientation;
    c) a fixed element comprising one of a fixed permanent magnet generating a magnetic flux where a moveable voice coil is operatively connected to said actuator and a fixed voice coil where a moveable permanent magnet is operatively attached to said actuator; and
    d) wherein the magnetic flux from said permanent magnet interacts with said electromagnetic flux when activated in a first polar orientation so as to cause said moveable element to move said actuator so as to close said shutter blade, and which magnetic flux will interact with said electromagnetic flux when activated in a second polar orientation so as to cause said moveable element to move said actuator so as to open said shutter blade.

2. A magnetic voice-coil shutter drive actuation system as described in claim 1, wherein said moveable element is located in one of a position peripheral of the aperture and not surrounding the aperture, and a position peripheral of the aperture and surrounding the aperture.

3. A magnetic voice-coil shutter drive actuation system as described in claim 1, further comprising a magnetic flux conducting member attached to a pole of said permanent magnet.

4. A magnetic voice-coil shutter drive actuation system as described in claim 2, wherein the moveable element does not surround the aperture and one of translates and rotates to move said actuator so as to open or close said shutter blade.

5. A magnetic voice-coil shutter drive actuation system as described in claim 1, wherein the magnetic flux produced by the permanent magnet defines a magnetic axis and the electromagnetic flux produced by the voice coil defines an electromagnetic axis and the magnetic axis and the electromagnetic axis are parallel.

6. A magnetic voice-coil shutter drive actuation system as described in claim 5, wherein the electromagnetic axis and the magnetic axis are parallel to a central axis for the aperture.

7. A magnetic voice-coil shutter drive actuation system as described in claim 1, wherein said fixed element is the voice coil and said moving element is the permanent magnet, and the voice coil is located in a position peripheral of the aperture and surrounding the aperture.

8. A magnetic voice-coil shutter drive actuation system for an optical shutter having an aperture with at least one shutter blade, comprising:
    a) an actuator operatively connected to an aperture shutter blade, said actuator operating to close said aperture shutter blade when moved in one direction and operating to open said aperture shutter blade when moved in an other direction;
    b) a moveable element comprising one of a moveable voice coil and a moveable permanent magnet operatively connected to said actuator, said voice coil being activatable to generate an electromagnetic flux in a first polar orientation and also being activatable to generate an electromagnetic flux in a second polar orientation;
    c) a fixed element comprising one of a fixed permanent magnet generating a magnetic flux where a moveable voice coil is operatively connected to said actuator and a fixed voice coil where a moveable permanent magnet is operatively attached to said actuator;
    d) wherein the magnetic flux from said permanent magnet will interact with said electromagnetic flux when activated in a first polar orientation so as to cause said moveable element to move said actuator so as to close said shutter blade, and which magnetic flux interacts with said electromagnetic flux when activated in a second polar orientation so as to cause said moveable element to move said actuator so as to open said shutter blade;
    e) wherein said moveable element is located in one of a position peripheral of the aperture and not surrounding the aperture, and a position peripheral of the aperture and surrounding the aperture;
    f) wherein the magnetic flux produced by the permanent magnet defines a magnetic axis and the electromagnetic flux produced by the voice coil defines an electromagnetic axis and the magnetic axis and the electromagnetic axis are parallel; and g) wherein the electromagnetic axis and the magnetic axis are parallel to a central axis for the aperture.

9. A magnetic voice-coil shutter drive actuation system as described in claim 8, further comprising a magnetic flux conducting member attached to a pole of said permanent magnet.

10. A magnetic voice-coil shutter drive actuation system as described in claim 8, wherein the moveable element does not surround the aperture and one of translates and rotates to move said actuator so as to open or close said shutter blade.

11. A magnetic voice-coil shutter drive actuation system as described in claim 9, wherein said fixed element is the voice coil and said moving element is the permanent magnet, and the voice coil is located in a position peripheral of the aperture and surrounding the aperture.

12. A magnetic voice-coil shutter drive actuation system as described in claim 11, wherein said permanent magnet rotates around a rotational axis parallel to its magnetic axis in order to move said actuator so as to open or close said shutter blade.

13. A magnetic voice-coil shutter drive actuation system as described in claim 1, wherein said fixed element is the permanent magnet and said moving element is the voice coil, and the voice coil is located in a position peripheral of the aperture and surrounding the aperture.

* * * * *